United States Patent
Zhao (10) Patent No.: US 9,473,915 B2
(45) Date of Patent: Oct. 18, 2016

(54) CALL VERIFICATION SYSTEM AND METHOD THEREOF AND MOBILE TERMINAL

(71) Applicant: Spreadtrum Communications (Shanghai) Co., Ltd., Shanghai (CN)

(72) Inventor: Pengfei Zhao, Shanghai (CN)

(73) Assignee: SPREADTRUM COMMUNICATIONS (SHANGHAI) CO., LTD., Shanghai (CN)

(*) Notice: Subject to any disclaimer, the term of this patent is extended or adjusted under 35 U.S.C. 154(b) by 0 days.

(21) Appl. No.: 14/790,191

(22) Filed: Jul. 2, 2015

(65) Prior Publication Data

US 2015/0350915 A1   Dec. 3, 2015

(30) Foreign Application Priority Data

May 30, 2014 (CN) .......................... 2014 1 0239714

(51) Int. Cl.

| | |
|---|---|
| *H04M 1/66* | (2006.01) |
| *H04W 4/20* | (2009.01) |
| *G06F 21/10* | (2013.01) |
| *H04W 12/06* | (2009.01) |
| *H04W 88/02* | (2009.01) |
| *H04L 9/32* | (2006.01) |

(52) U.S. Cl.
CPC ............... *H04W 4/20* (2013.01); *G06F 21/10* (2013.01); *H04W 12/06* (2013.01); *H04L 9/3281* (2013.01); *H04W 88/02* (2013.01)

(58) Field of Classification Search
CPC ............... H04W 12/12; H04W 8/245; H04M 1/72519; G06F 21/6245; G06F 21/10
USPC ......... 455/410, 418, 550.1; 726/28; 713/170
See application file for complete search history.

(56) References Cited

U.S. PATENT DOCUMENTS

| | | | | |
|---|---|---|---|---|
| 6,564,323 | B2* | 5/2003 | Takahashi ........... | G06F 21/6245 713/170 |
| 8,768,838 | B1* | 7/2014 | Hoffman ................ | G06Q 40/00 705/44 |
| 2004/0082310 | A1* | 4/2004 | Huang .................. | G08C 17/02 455/401 |
| 2005/0268088 | A1* | 12/2005 | Okada ..................... | B60R 25/24 713/153 |
| 2006/0138212 | A1* | 6/2006 | Prudent .................. | G06Q 30/00 235/375 |
| 2008/0204192 | A1* | 8/2008 | Hamamura ......... | B60R 25/2072 340/5.72 |
| 2008/0285498 | A1* | 11/2008 | Lee ....................... | H04W 12/08 370/313 |

(Continued)

FOREIGN PATENT DOCUMENTS

| | | |
|---|---|---|
| CN | 10119367 | 2/2008 |
| CN | 102685296 | 9/2012 |

*Primary Examiner* — Danh Le
(74) *Attorney, Agent, or Firm* — Andrew F. Young, Esq.; Lackenbach Siegel, LLP (57) ABSTRACT

A call verification system in mobile terminals, including a calling/called unit, and the calling unit includes: a verification code acquiring module, a packaging module, a transmitting module; the called unit comprises a receiving module, a storage module, an analysis module, a verification code module and a call control module. A method includes steps of acquiring and packaging the verification code; transmitting verification code while calling; parsing and acquiring the verification code at the called terminal; matching the verification code with the standard verification code and intercepting the mismatched call establishment request. The effects are achieved without configuration of a mobile network and the service of operators; no delay for the users no effect on existing communication business; intercepting crank calls without answering or hanging up.

8 Claims, 5 Drawing Sheets

(56) References Cited

U.S. PATENT DOCUMENTS

2011/0183657 A1* 7/2011 Lim ............... H04M 3/4234
                                                    455/415
2012/0180115 A1* 7/2012 Maitland ............ G06F 21/34
                                                    726/7
2012/0192261 A1* 7/2012 Blot-Levevre ....... G06Q 20/02
                                                    726/10
2013/0139239 A1* 5/2013 Jillings ............... H04L 63/12
                                                    726/7
2015/0087265 A1* 3/2015 Disraeli ............. H04W 12/06
                                                    455/411

* cited by examiner

CALL VERIFICATION SYSTEM AND METHOD THEREOF AND MOBILE TERMINAL

CROSS-REFERENCE TO RELATED APPLICATIONS

The present application claims priority to and the benefit of Chinese Patent Application No. CN 201410239714.8, filed on May 30, 2014, the entire contents of which is incorporated herein by reference.

BACKGROUND OF THE INVENTION

1. Field of the Invention

The present invention relates to a technical field regarding call controlling, more specifically, to a call verification system and method thereof and mobile terminal.

2. Description of the Related Art

The widely use of mobile terminals brings great convenience to the users for the features of supporting users to dial or answer a call any time and any where. However, individual phone number tends to be easier to leak to the public due to the awful safety protection solution for the mobile terminals, which causes some issues such as the crank calls. Some companies like estate agencies or private lending organizations take improper means to obtain phone numbers for seeking potential customers and even dial to the potential customers all the time to achieve some business objects. As a result, people's normal lives are hampered by such crank calls. Moreover, some means provided to avoid those crank calls may also shield some important calls which were not recorded in the contacts list in a mobile phone, which may bring some troubles or loss to users.

To solve the above safety issues, Chinese Patent (CN102685296A) disclosed a disturbance-resistant telephone. A calling voice identity recognition processing system is installed in the telephone. A method of the disturbance-resistant telephone comprises the following steps of: utilizing the characteristic that crank calls repeatedly play advertising and fax prompt tones prerecorded and cured in a voice record-play IC (Integrated. Circuit) to implement disturbance, utilizing the fact that the crank calls are not dialed directly by a caller but is to control the caller to dial according to a voice prompt, therefore judging and filtering the crank calls; and temporarily isolating dialing ringing, then carrying out a serial of judgment steps and judgment methods such as voice prompt and the like, and determining and filtering various crank calls. The crank calls defined in the above technical solution refers to the crank calls that "repeatedly play advertising and fax prompt tones prerecorded and cured in a voice record-play IC", however, lots of those crank calls are operated by labor. Therefore, it can not absolutely solve the existing issues.

Chinese Patent (CN101119367) disclosed a method and the system for realizing a call firewall in communicating terminals. The method comprises the following steps: presetting the telephone numbers which are not wanted to users in the telephone number groups of the fire wall in the memorizer on a communicating terminals; selecting matched types for the telephone numbers; carrying out corresponding matched set to the digits of the preset telephone number; receiving calls and obtaining the dialing telephone numbers; selecting the preset telephone numbers and carrying out search and matching to the dialing telephone numbers, and also the communicating terminals will refuse the calling numbers and restore to normal standby status if the same digits are searched and matched; finally, the communicating terminals will normally answer the calls if no same digits are searched and matched. Compared with the prior art, the functions of the call firewall designed by the invention is improved and meets various demands for users to select a call firewall with a proper ability to shield crank calls, and also realizes a upgraded call firewall function. In the above technical solution, a target telephone number is set through a call firewall. The intercept to crank calls fails to be preformed without the target telephone number. Moreover, the crank calls will be shielded based on the condition that the crank calls have been answered before and the corresponding telephone numbers are recorded in the call firewalls. Hence, it can not absolutely solve the existing issues.

ASPECTS AND SUMMARY OF THE INVENTION

To solve the issues in the prior art of not existing a mechanism, system or means to intercept crank calls before answering them, a call verification system and a mobile terminal are provided, which comprise the following contents.

A call verification system, applied to mobile terminals, including a calling unit and a called unit, wherein the calling unit comprises:

a verification code acquiring module for acquiring the verification code inputted from outside;

a packaging module, connecting the verification acquiring module, configured for packaging the verification code in a predetermined format and thereby forming a packaged transmission identification;

a transmitting module, connecting the packaging module, configured for transmitting the transmission identification when a call establishment request is transmitted to a called mobile terminals;

wherein the called unit comprises:

a receiving module for receiving the transmission identification;

a storage module for storing a preset standard verification code;

an analysis module, connecting the receiving module, configured for acquiring the transmitting identification and thereby parsing out a corresponding verification code;

a verification code module, respectively connecting the storage module and the analysis module, configured for acquiring a parsed verification code, matching the verification code with the standard verification code, and outputting matching outcomes;

a call control module, connecting the verification code module, configured for acquiring the matching outcomes, controlling the called unit to intercept the call establishment request mismatching the standard verification code according to the matching outcomes.

Preferably, the calling unit further comprises:

a calling message acquiring module, connecting the packaging module, configured for acquiring a calling message that aims to identify the call establishment request and for transmitting the calling message to the packaging module;

the transmission identification packaged in a predetermined format comprises transmission marker bits, the verification code and the calling message.

Preferably, the analysis module is further used for parsing out the corresponding calling message from the transmission identification;

the called unit further comprises a calling message module, connecting the analysis module, configured for acquiring the calling message and presenting the calling message on the message display interface of the mobile terminals.

Preferably, the transmitting identification packaged in a predetermined format comprises transmission flag and the verification code.

Preferably, the packaging module packages the verification code to be transmitted in order to form the transmitting identification transmitted through UUS communication protocol.

Preferably, total length of the transmitting identification is no more than 35 bytes.

A call verification method, applied to mobile terminals, comprising a calling process which comprises:

S1a, acquiring a verification code and calling number input from outside;

S2a, packaging the verification code so as to form a transmission identification in a predetermined format;

S3a, transmitting the transmission identification when a call establishment request is transmitted to a corresponding mobile terminal.

Preferably, acquiring a calling number, the verification code and a calling message of the mobile terminals for identifying a call establishment request, forming a corresponding transmitting identification by packaging, and transmitting the calling message while transmitting the transmission identification to a called mobile terminal.

Preferably, in S2a, the transmission identification in a predetermined format can be transmitted through UUS communication protocol.

Preferably, total length of the transmitting identification is no more than 35 bytes.

A call verification method, applied to mobile terminals, comprising a called process which comprises:

S1b, receiving a call establishment request transmitted from outside;

S2b, determining whether a corresponding transmission identification transmitted by the mobile terminals has been received, if not, turning to S6b;

S3b, parsing the transmitting identification and determining whether a corresponding verification code had been included, if not, turning to S6b;

S4b, determining whether the verification code matches a preset standard verification code, if not, turning to S6b;

S5b, permitting responding to the call establishment request and exiting;

S6b, intercepting the call establishment request and exiting.

Preferably, after accomplishing S1b, determining whether a function of the verification code has been turned on, if so, proceeding S2b, if not, proceeding S11, determining whether a function of the calling message has been turned on, if not, proceeding a normal call procedure;

S12, determining whether the transmission identification which is transmitted from a calling mobile terminal and identifies the call establishment request, if not, turning to S6b;

S13, parsing the transmission identification, and determining whether the transmission identification includes a corresponding calling message, if not, turning to S6b;

S14, performing a normal call procedure and presenting the calling message on a message display interface of the mobile terminals and exiting.

The positive effects of the above technical solutions are as follows:

1) It can be achieved by a mobile terminal without configuring the mobile network or using the service of the operators;
2) no delay for the users and do not affect the existing communication business;
3) intercepting crank calls without manually answering or hanging up the phone;

flexible configuration, simple structure, low cost.

BRIEF DESCRIPTIONS OF THE DRAWINGS

The accompanying drawings, together with the specification, illustrate exemplary embodiments of the present disclosure, and, together with the description, serve to explain the principles of the present invention.

DETAILED DESCRIPTION OF A PREFERRED EMBODIMENT

The present invention will be further illustrated in combination with the following figures and embodiments, but it should not be deemed as limitation of the present invention.

In the prior art, there are several methods for shielding crank calls as follows, 1) a method for intercepting crank calls by using a call firewall. In this way, the phone numbers of the crank calls had to be recorded at least once in the call firewall. Although, it is possible to set the numbers of the crank calls by manual operation, it is not possible to cover all the crank call numbers, which is inconvenient.

2) a method for intercepting crank calls by using the calling message contained in the calling number. In this way, people have to determine by themselves whether a call is a crank call or not, which can not intercept crank calls automatically and require the deployment of the telecom operator with relevant business provided, its hard to implement this solution.

Figure 1:
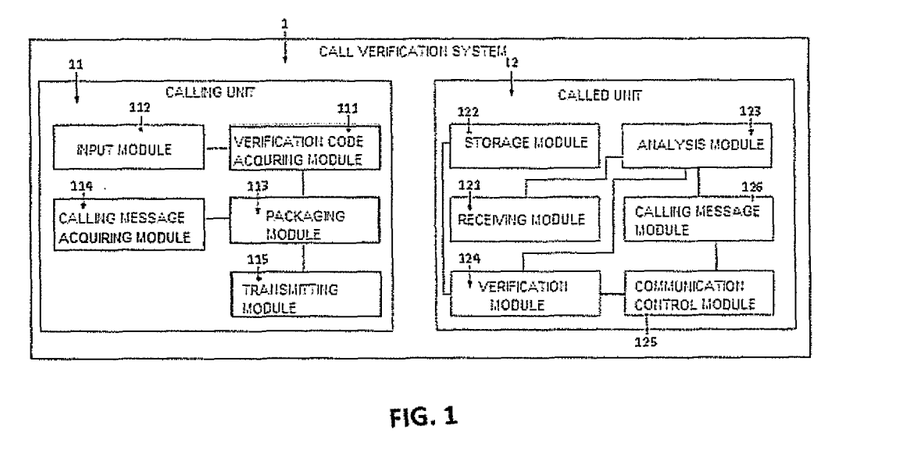
FIG. 1 illustrates a structure diagram of a call verification system in a preferred embodiment of the present invention.

To solve the above mentioned issues, in one of the preferred embodiment, a call verification system is provided, the specific structure of the system is shown in FIG. 1;

In one of the preferred embodiments in the present invention, Call Verification System 1 applied in mobile terminals. Call Verification System 1 comprises a Calling Unit 11 and a Called Unit 12; Calling Unit 11 is used for initiating the call establishment request to target mobile terminals; Called Unit 12 is used for receiving the call establishment request from outside and establishing a corresponding call connection.

Further, in a preferred embodiment of the present invention, Calling Unit 11 comprises a Verification Code Acquiring Module 111 for achieving verification codes input from outside. Preferably, the verification codes are inputted together with dialing numbers by users simultaneously. For instance, inputting "10086#1234", wherein 10086 refers to a dialing number, # refers to a separator, 1234 refers to a verification code. And Verification Code Acquiring Module 111 acquires the verification code 1234 based on the input format defined by the users.

Further, in a preferred embodiment of the present invention, Verification Code Acquiring Module 111 can be connected to a Input Module 112 which can be the dial plate of a mobile terminal.

In a preferred embodiment of the present invention, Calling Unit 11 further includes:

a Packaging Module 113 connecting Verification Code Acquiring Module 111 for acquiring the verification codes, and packaging the verification codes in a predetermined format and thereby forming a packaged transmission identification.

Further, in a preferred embodiment of the present invention, the transmitting identification can be transmitted through UUS communication protocol. The UUS communication protocol is a User-to-User Signalling communication protocol. Based on requirements of users, it is possible to transfer customized messages to the opposite users transparently through the network.

Further, in a preferred embodiment of the present invention, the transmission identification can be transmitted through UUSI communication protocol subordinated to the UUS communication protocol.

Figure 2:
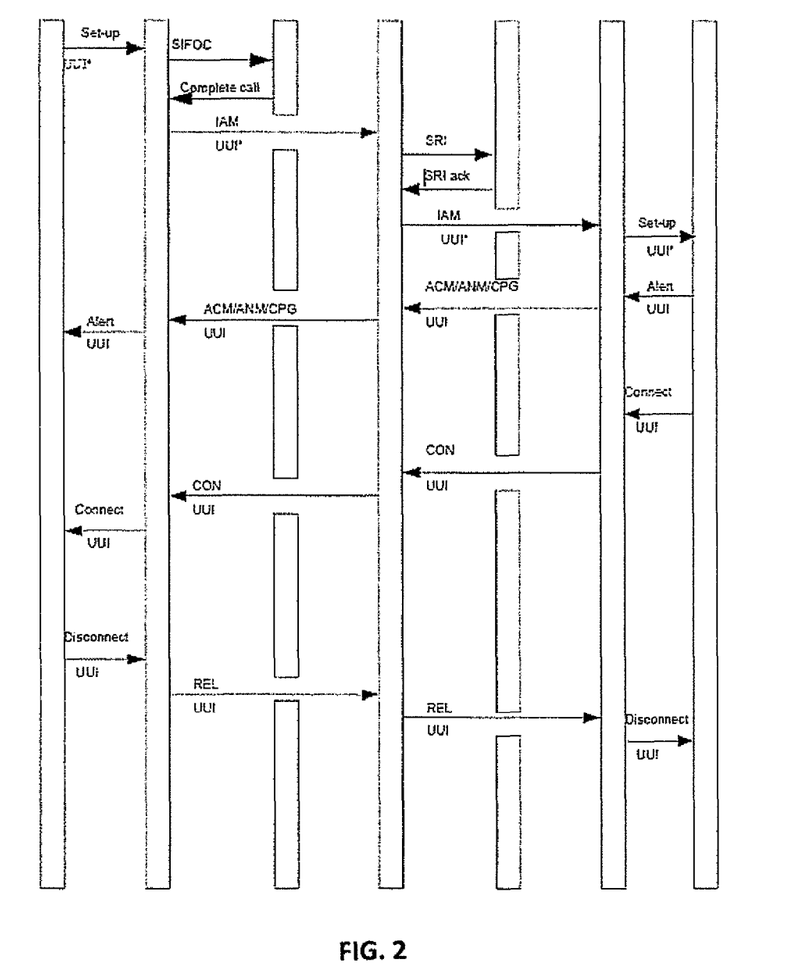
FIG. 2 illustrates a data sequence chart of UUS communication protocol in an embodiment of the present invention.

As shown in FIG. 2 illustrating a sequence chart of a signaling transmission using the UUS communication protocol, the call establishment request is transmitted from Calling End a (MSa) to Called End b (MSB), the signaling interaction between Calling End a and Called End b is performed in sequence through MSCa (Mobile Switching Center for a), VLR (Visitor Location Register), GMSC (Gate Mobile Switching Center), HLR (Home Location Register, HLR).

Figure 3:
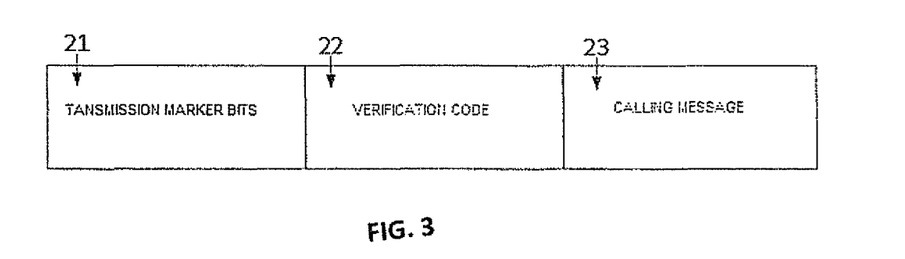
FIG. 3 illustrates a date structure diagram of the transmission identification in an embodiment of the present invention.

Further, in a preferred embodiment of the present invention, as shown in FIG. 3, the transmission identification includes Transmission Marker Bits 21 and Verification Code 22, wherein the transmission marker is Char, the verification code is Int. Preferably, the verification code is 4 bits Int value, each bit ranges from 0-9, such as "1234" as mentioned above.

Preferably, in some network, length of UUI is supported to be 35 bits at the most. So that even the longest length of the cell supported is 130 bits, the length of the transmission identification is still limited within 35 bits in the preferred embodiment.

Further, in a preferred embodiment of the present invention, matters packaged in the transmission identification include not only the verification code but also the calling message of the mobile terminal which initiates the calling. Therefore, as shown in FIG. 3, the above transmitting identification includes Calling Message 23 which also belongs to Char. The total length of the transmission identification including the transmission marker bits, verification code and the transmission identification of the calling message should not be over 35 bits.

Therefore, in a preferred embodiment of the present invention, Calling Unit 11 further comprises a Calling Message Acquiring Module 114 connecting Packaging Module 113. Calling Message Acquiring Module 114 is used for acquiring the above calling message.

In a preferred embodiment of the present invention, the calling unit 11 further comprises:

a Transmitting Module 115, connecting Above Packaging Module 113, for transmitting corresponding transmitting identifications to the mobile terminal.

Further, in a preferred embodiment of the present invention, Transmitting Module 115 transmits the transmission identification to a target mobile terminal through the network while the calling unit transmits the call establishment request to the target mobile terminal.

In a preferred embodiment of the present invention, as shown in FIG. 1, the called unit 12 comprises:

a Receiving Module 121, receiving the transmission identification transmitted from outside while receiving the call establishment request from outside;

a Storage Module 122 storing a preset standard verification code.

In a preferred embodiment of the present invention, the preset standard verification code reserved in a specific mobile terminal is unique, and the quantity of the byte of the standard verification code is the same with that of the forgoing verification code, for instance, both are 4 bits int.

an Analysis Module 123 respectively connecting Storage Module 122 and Receiving Module 121. In an embodiment of the present invention, Analysis Module 123 obtains the corresponding verification code by analyzing the transmission identification received from Receiving Module 121. Preferably, the transmission identification is packaged in a predetermined format, therefore, a corresponding regulation for performing the analysis is necessary, so that the corresponding verification code in the transmission identification can be achieved. In another preferred embodiment, as Calling Unit 11 may include calling message when sending the transmission identification, Analysis Module 123 achieves the corresponding calling message when performing the analysis.

a Verification Module 124, respectively connecting Analysis Module 123 and Storage Module 122, for parsing out the verification code provided by Analysis Module 123. In a preferred embodiment of the present invention, after the verification code is obtained by Verification Code Module 124, the verification code is matched with the standard verification reserved in Storage Module 122 and outputting a matching result.

a Call Control Module 125, connected to Verification Module 124. In a preferred embodiment of the present invention, Call Control Module 125 performs the corresponding action based on the matching results outputted by Verification Code Module 124, specifically comprises the following contents:

when the verification code is not matched up with the standard verification code, the mobile terminal sending the call establishment request does not belong to the trustful mobile terminal, and Call Control Module 125 intercepts the call establishment request.

when the verification code is matched up with the standard verification code, the mobile terminal sending the call establishment request belongs to the trustful mobile terminal, and the users can decide to hang up or get through the phone.

In a preferred embodiment of the present invention, Called Unit 12 further comprises:

A Calling Message Module 126, connecting the analysis module, configured for obtaining the analyzed calling message and presenting the same on a display interface of the mobile terminal.

Figure 4A:
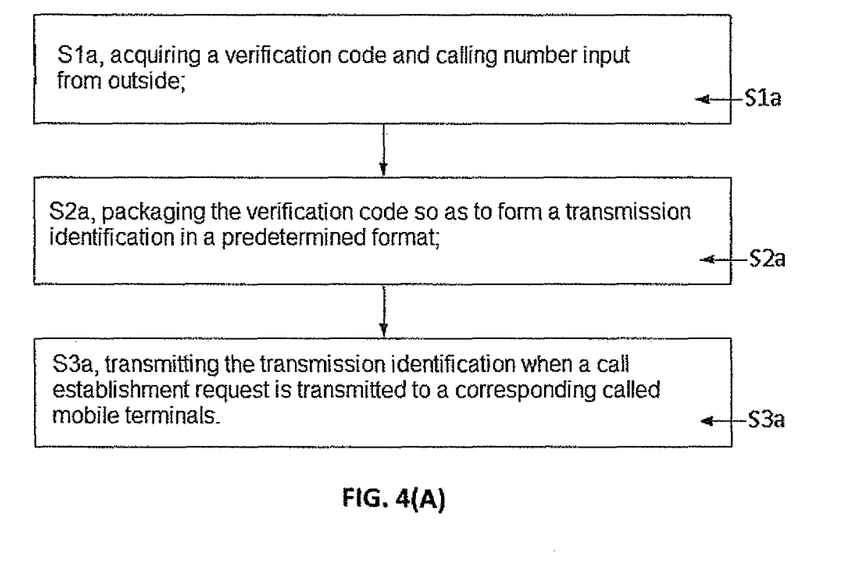
FIGS. 4(A), 4(B) and 5 illustrate a flow chart of the method adopting the verification system in an embodiment of the present invention.

In a preferred embodiment of the present invention, the call verification method using the call verification system comprises:

a calling procedure, as shown in FIG. 4a, including:

S1a, acquiring a verification code and calling number input from outside;

In a preferred embodiment of the present invention, the calling number is input by an input module (e.g. the dialing plate of the mobile terminal), meanwhile, inputting the corresponding verification code; the input format of the verification code is disclosed as above contents.

S2a, packaging the verification code so as to form a transmission identification in a predetermined format;

In a preferred embodiment of the present invention, inputting the verification code and packaging the verification code into a corresponding transmission identification, optionally, acquiring the calling message corresponding to the calling mobile terminal, and forming the transmission identification through packaging the verification code and calling message.

Further, in a preferred embodiment of the present invention, the transmission identification is in a predetermined format transmitted in UUS communication protocol, as shown in FIG. 3.

Further, in a preferred embodiment of the present invention, the total length of the transmission identification is no more than 35 bytes.

S3a, transmitting the transmission identification when a call establishment request is transmitted to a corresponding called mobile terminals.

In a preferred embodiment of the present invention, the calling mobile terminal is transmitting the corresponding transmission identification to a target mobile terminal while transmitting the call establishment request to the target mobile terminal, i.e., the transmission identification is attached to the call establishment request and transmitted with the call establishment request to the target mobile terminal.

Figure 4B:
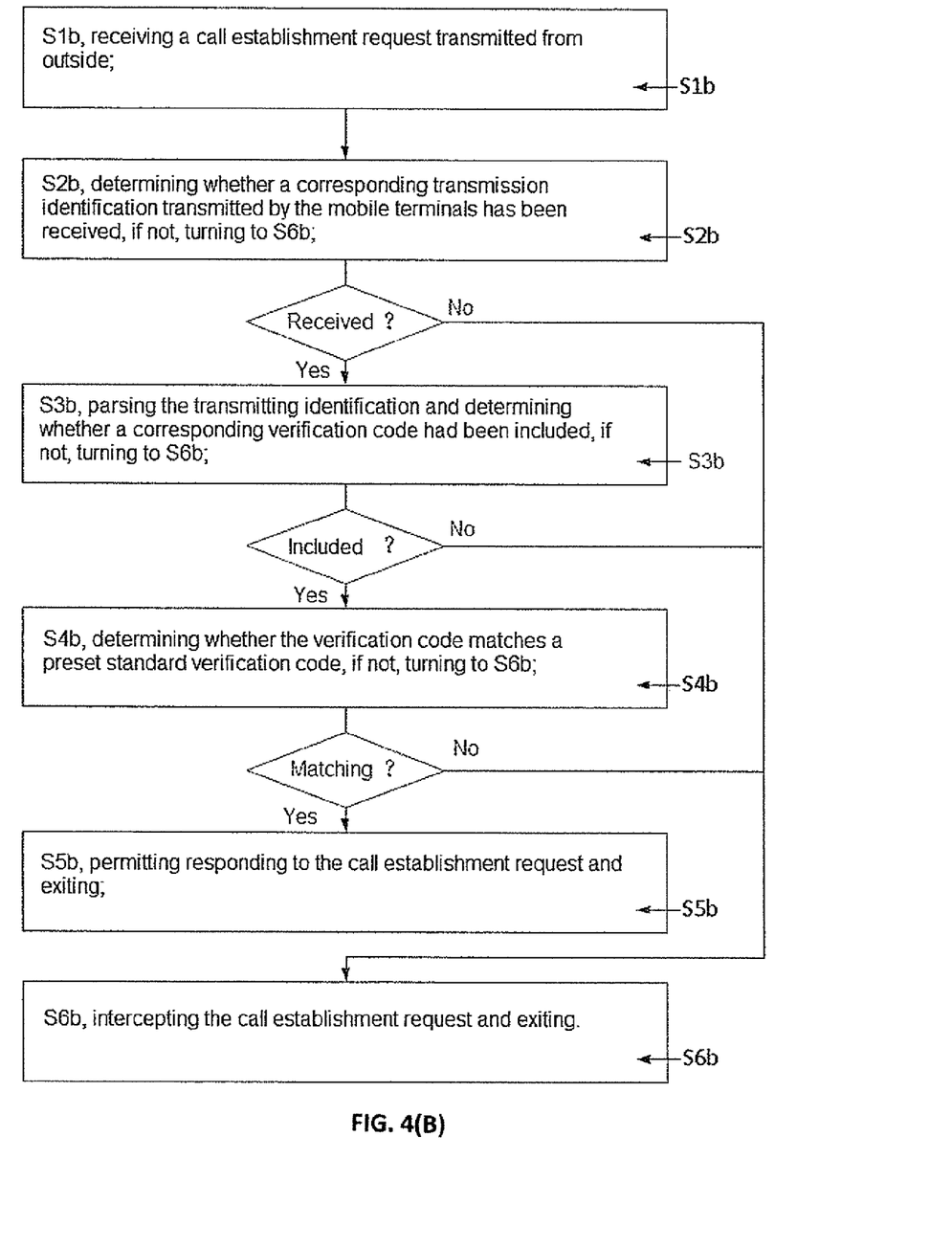

In a preferred embodiment of the present invention, the call verification method further comprises a called process, as shown in FIG. 4b, comprising:

S1b, receiving a call establishment request transmitted from outside;

S2b, determining whether a corresponding transmission identification transmitted by the mobile terminals has been received, if not, turning to S6b;

S3b, parsing the transmitting identification and determining whether a corresponding verification code had been included, if not, turning to S6b;

S4b, determining whether the verification code matches a preset standard verification code, if not, turning to S6b;

S5b, permitting responding to the call establishment request and exiting;

S6b, intercepting the call establishment request and exiting.

In a preferred embodiment of the present invention, the forgoing process belongs to the process identifying and matching the verification code. Briefly, it determines whether the verification code function in the mobile terminal is in on-state when the called mobile terminal receives the call establishment request.

If the verification code is in on-state, the called mobile terminal determines whether the corresponding transmission identification is transmitted with the call establishment request; if the transmission identification exists, analyzing the transmission identification and determining whether the analyzed contents comprise the corresponding verification code.

In a preferred embodiment of the present invention, if the transmission code comprises the corresponding verification code, it means that the calling mobile terminal transmits the verification code accompanied with the call establishment request, and thereby a matching process is performed to the verification code.

In a preferred embodiment of the present invention, if the transmission identification does not comprise the corresponding verification code, it means that the calling mobile terminal does not transmit the verification code, and it should be deemed as a crank call, and intercepting the call establishment request.

Figure 5:
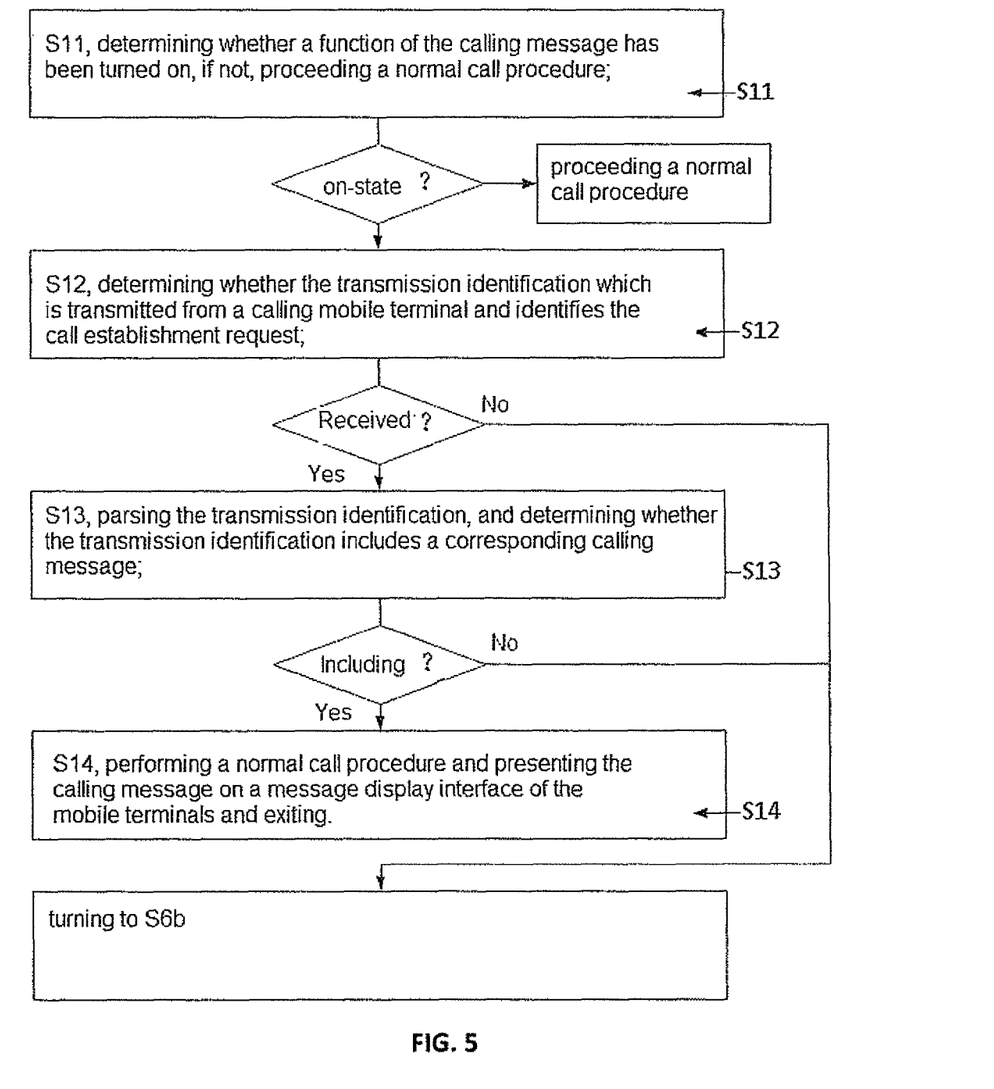

In a preferred embodiment of the present invention, after accomplishing S1b, determining whether the function of the verification code has been turned on, if so, proceeding S2b, if not, as shown in FIG. 5, proceeding the steps as follows:

S11, determining whether the function of the calling message has been turned on, and proceeding the normal call procedure if the function of the calling message has not been turned on;

S12, determining whether the transmission identification which is transmitted from a calling mobile terminal and identifies the call establishment request, if not, turning to S6b;

S13, parsing the transmission identification, and determining whether the transmission identification includes a corresponding calling message, if not, turning to S6b;

S14, performing a normal call procedure and presenting the calling message on a message display interface of the mobile terminals and exiting.

In a preferred embodiment of the present invention, the forgoing process relates to the condition that the calling message has been turned on. In some cases, users do not use the verification code, for the purpose of intercepting crank calls, the users could be prevent from the crank calls through reading the calling message displayed on the message display interface of the mobile terminal.

Further, in a preferred embodiment of the present invention, if the verification code function is not used, a judgment is performed automatically to determine whether the calling message function is used. If the calling message function is not used, a judgment is performed to determine whether the corresponding transmission identification has been received and whether the transmission identification comprises the corresponding calling message.

In a preferred embodiment of the present invention, if the transmission identification comprises the corresponding calling message, the message is displayed on the message display interface of the mobile terminal, such as a display of the mobile terminal, for view of the users and determining whether a response to the call is necessary; if the transmission identification does not comprises the corresponding calling message, the calling mobile terminal would be unidentified, and it belongs to a crank call, and thereby the call establishment request is intercepted.

In a preferred embodiment of the present invention, when the foregoing verification code function and calling message function are not used, the mobile terminal operates in normal call state, it accepts call establishment requests and performs the normal call procedure.

In a preferred embodiment of the present invention, it further comprises a mobile terminal including the forgoing call verification system.

In a preferred embodiment of the present invention, it further comprises a mobile terminal adopting the forgoing call verification method.

The described embodiments are only part of the available embodiments for the present invention instead of all the embodiments. It should be appreciated that according to the embodiments in the present invention, the other equivalent embodiments which may be achieved by the skilled in the art without making any inventive work should also fall into the scope of the present invention.

What is claimed is:

1. A call verification system, applied to mobile terminals, including a calling unit and a called unit, wherein the calling unit comprises:
   a verification code acquiring module for acquiring the verification code inputted from outside;
   a packaging module, connecting the verification acquiring module, configured for packaging the verification code in a predetermined format and thereby forming a packaged transmission identification;
   a transmitting module, connecting the packaging module, configured for transmitting the transmission identification when a call establishment request is transmitted to a called mobile terminals;
   wherein the called unit comprises:
   a receiving module for receiving the transmission identification;
   a storage module for storing a preset standard verification code;
   an analysis module, connecting the receiving module, configured for acquiring the transmission identification and thereby parsing out a corresponding verification code;
   a verification code module, respectively connecting the storage module and the analysis module, configured for acquiring a parsed verification code, matching the verification code with the standard verification code, and outputting matching outcomes;
   a call control module, connecting the verification code module, configured for acquiring the matching outcomes, controlling the called unit to intercept the call establishment request mismatching the standard verification code according to the matching outcomes.

2. The call verification system as disclosed in claim 1, wherein the calling unit further comprises:
   a calling message acquiring module, connecting the packaging module, configured for acquiring a calling message that aims to identify the call establishment request and for transmitting the calling message to the packaging module;
   the transmission identification packaged in a predetermined format comprises transmission marker bits, the verification code and the calling message.

3. The call verification system as disclosed in claim 2, wherein the analysis module is further used for parsing out the corresponding calling message from the transmission identification;
   the called unit further comprises a calling message module, connecting the analysis module, configured for acquiring the calling message and presenting the calling message on the message display interface of the mobile terminals.

4. The call verification system as disclosed in claim 1, wherein the transmitting identification packaged in a predetermined format comprises transmission flag and the verification code.

5. The call verification system as disclosed in claim 1, wherein the packaging module packages the verification code to be transmitted in order to form the transmitting identification transmitted through UUS communication protocol.

6. The call verification system as disclosed in claim 5, wherein total length of the transmitting identification is no more than 35 bytes.

7. A call verification method, applied to mobile terminals, comprising a called process which comprises:
   S1b, receiving a call establishment request transmitted from outside;
   S2b, determining whether a corresponding transmission identification transmitted by the mobile terminals has been received, if not, turning to S6b;
   S3b, parsing the transmitting identification and determining whether a corresponding verification code had been included, if not, turning to S6b;
   S4b, determining whether the verification code matches a preset standard verification code, if not, turning to S6b;
   S5b, permitting responding to the call establishment request and exiting;
   S6b, intercepting the call establishment request and exiting.

8. The call verification method as disclosed in claim 7, wherein:
   after accomplishing S1b, determining whether a function of the verification code has been turned on,
   if so, proceeding S2b,
   if not, proceeding S11, determining whether a function of the calling message has been turned on, if not, proceeding a normal call procedure;
   S12, determining whether the transmission identification which is transmitted from a calling mobile terminal and identifies the call establishment request, if not, turning to S6b;
   S13, parsing the transmission identification, and determining whether the transmission identification includes a corresponding calling message, if not, turning to S6b;
   S14, performing a normal call procedure and presenting the calling message on a message display interface of the mobile terminals and exiting.

* * * * *